United States Patent [19]

Hoernig et al.

[11] Patent Number: 4,681,185

[45] Date of Patent: Jul. 21, 1987

[54] APPARATUS FOR THE AUTOMATIC ENGAGEMENT AND DISENGAGEMENT OF DRIVE ELEMENTS OF A MOTOR VEHICLE

[75] Inventors: Rudolf Hoernig, Esslingen-St., Bernhard; Peter Herges, Stuttgart; Bernd Knoff, Esslingen; Karl-Heinz Richter, Kernen; Karl-Heinz Buechle, Sachsenheim; Henning Wallentowitz, Aichwald, all of Fed. Rep. of Germany

[73] Assignee: Daimler-Benz Aktiengesellschaft, Fed. Rep. of Germany

[21] Appl. No.: 828,275

[22] Filed: Feb. 11, 1986

[30] Foreign Application Priority Data

Feb. 16, 1985 [DE] Fed. Rep. of Germany ....... 3505455

[51] Int. Cl.⁴ .......................................... B60K 23/08
[52] U.S. Cl. .................................................. 180/247
[58] Field of Search ............... 180/248, 249, 250, 247; 74/710.5

[56] References Cited

U.S. PATENT DOCUMENTS

| | | | |
|---|---|---|---|
| 3,272,278 | 9/1966 | Budzich | 180/248 |
| 4,432,431 | 2/1984 | Russell | 180/248 |
| 4,538,700 | 9/1985 | Suzuki et al. | 180/248 |
| 4,559,846 | 12/1985 | Cochran et al. | 180/247 |
| 4,560,025 | 12/1985 | Suzuki et al. | 180/247 |
| 4,586,583 | 5/1986 | Yamakawa et al. | 180/247 |
| 4,609,064 | 9/1986 | Suzuki et al. | 180/247 |

FOREIGN PATENT DOCUMENTS

| | | |
|---|---|---|
| 0043237 | 1/1982 | European Pat Off. . |
| 3225459 | 1/1983 | Fed. Rep. of Germany . |
| 3345294 | 7/1984 | Fed. Rep. of Germany . |
| 3345470 | 7/1984 | Fed. Rep. of Germany . |
| 2132146 | 4/1984 | United Kingdom . |
| 2146727 | 4/1985 | United Kingdom . |
| 2104178 | 5/1985 | United Kingdom . |
| 2145522 | 9/1985 | United Kingdom . |

Primary Examiner—Richard A. Bertsch
Attorney, Agent, or Firm—Barnes & Thornburg

[57] ABSTRACT

Apparatus for the automatic engagement and disengagement of the drive components of a motor vehicle, particularly of the drive of at least one additional axle and/or of locks for auxiliary gear and/or differential gear. The apparatus has sensors for sensing the rotary speeds of the wheels and the steering angle of the vehicle and a control unit which activates the drive components individually, simultaneously or in a given sequence as a function of: The travelling speed; the vehicle acceleration; the slip of the wheels; and the movement condition of the vehicle as a function of the steering angle. The apparatus also has an adaptively operating matching electronic system for accounting for the rotary speeds of the wheels and for the steering angle. An advantage of this apparatus is the engaging of required drive components automatically with narrow limit values and tolerances in necessary situations.

32 Claims, 5 Drawing Figures

APPARATUS FOR THE AUTOMATIC ENGAGEMENT AND DISENGAGEMENT OF DRIVE ELEMENTS OF A MOTOR VEHICLE

BACKGROUND AND SUMMARY OF THE INVENTION

The present invention relates to an apparatus for the automatic engagement and disengagement of drive components of a motor vehicle with a driven axle, particularly the drive of at least one additional axle, and locks for auxiliary gear and differential gear.

An apparatus of this type is described in German Offenlegungsschrift No. 3,225,459. In this apparatus a change is automatically made from two-wheel drive to four-wheel drive for a given time when the difference between an "actual slip value" calculated from the rotary speeds of the wheels and a "theoretical slip value" associated with the steering angle exceeds a predetermined level. In this apparatus, two-wheel drive is adopted in tight curves, that is to say for a high "theoretical slip value", in order to avoid so-called "tight corner braking". These measures are simple steps which are not sufficient for practical driving operations, and do not appear to justify the expense of such apparatus. On tight curves particularly, four-wheel drive may be especially advantageous, but this is just where it is disengaged in the known apparatus.

Deducing the "theoretical slip value" solely from the steering angle may also lead to misinterpretations, because it is entirely possible for the vehicle to slip directly forward with wheels locked, or to drift around a curve with the wheels set straight. It is also impossible in the above apparatus to choose sufficiently low threshold values for the engagement of the four-wheel drive to ensure that unnecessary engagements are are avoided, because it is necessary to take into consideration the tolerances caused by different effective wheel diameters due to different tire pressure, different tread wear, load changes etc.

The advantage of a four-wheel drive compared to a two-wheel drive is that it improves traction and increases travelling stability. However, for both two-wheel and four-wheel drives, the driver will realize that the stability limit is being exceeded only at the physical adhesion limit. In the majority of instances, however, it is then too late for a correction.

The engagement of existing four-wheel components (drive of an additional axle, locks of auxiliary gears and/or differential gears) is also advantageous when starting from a stop, when accelerating the driven wheels, and generally when the movement condition of the vehicle threatens to exceed the stability limit.

It is therefore an objective of the present invention to provide an apparatus for the automatic engagement and disengagement of drive components of a motor vehicle which is capable of generating the switching signals and performing the engagements and disengagements in the situations mentioned with the lowest possible tolerance values and tolerance ranges.

This and other objectives are achieved by providing the apparatus for engaging and disengaging of the drive components with a sensory means for sensing the rotary speeds of the wheels of the vehicle, the rotary speeds of the input shafts of the motor vehicle, and the steering angle of the vehicle. Also provided is a control means for receiving inputs from the sensory means and comparing these inputs with stored reference values. The control means then selects a switching stage during operation of the vehicle, the switching stages being various combinations of engagements of an additional axle and locks for auxiliary and differential gear.

In order to obtain maximum traction when starting, the four-wheel drive (engagement of all the drivable axles) is always engaged below an upper limit speed value subject to hysteresis. The disengagement occurs when the upper limit speed value is exceeded, provided that the wheel acceleration of a driven axle is lower than a given limit value.

When the vehicle travelling speed falls below the lower limit speed value, the four-wheel drive is engaged again, in order to ensure full traction for a possible following acceleration phase.

The following remarks refer to vehicles with rear-axle drive and engageable front-axle drive, also with lockable central, rear-axle and front-axle differentials.

During travel, the engagement of the four-wheel components may occur when the instantaneous slip value exceeds a given limit slip value. In this context, a distinction should be made between tractive slip (when the circumferential velocity of the driven wheels is greater than the travelling speed) and thrust slip.

The instantaneous slip value is derived from the wheel rotary speeds. However, in order to avoid the above-mentioned misinterpretations, the limit slip value is derived not from the steering wheel angle, but is instead associated with the vehicle travelling speed, and additionally with the difference in the rotary speeds of the front wheels when switching back.

The engagement of the four-wheel components may also occur according to the present invention when, above a second limit speed value, a quantity characteristic of the movement condition of the vehicle does not coincide with a value or value range associated with the steering angle and the vehicle travelling speed. This is important, for example, when the vehicle enters a tightening curve without longitudinal acceleration. Here the driver may be surprised by the swinging tail of the vehicle, because it is not necessary for the limit slip value to have been exceeded. Under these conditions, the steering angle value determines the critical state reliably.

To enable the limit values and tolerance ranges to be determined as accurately and as narrowly as possible respectively, an adaptively operating matching electronic system is provided which adjusts the control unit to take into account different wheel diameters and the steering angle applicable to direct forward travel.

Further objects, features, and advantages of the present invention will become more apparent from the following description when taken with the accompanying drawings, which show for purposes of illustration only, an embodiment constructed in accordance with the present invention.

DETAILED DESCRIPTION OF THE DRAWINGS

Figure 1:
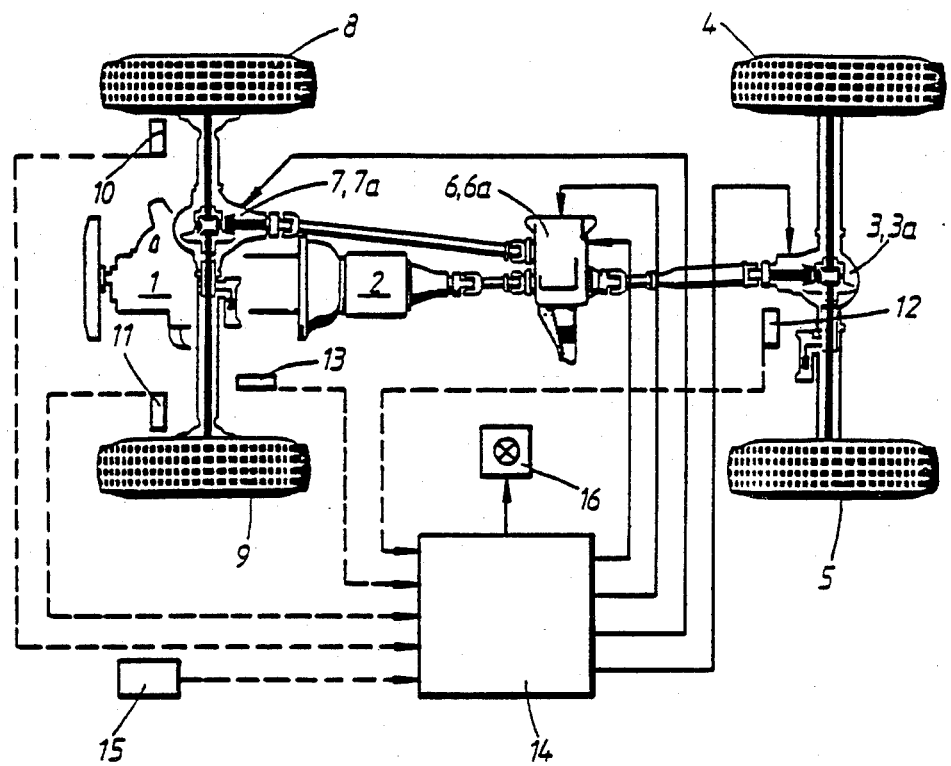
FIG. 1 schematically shows a preferred embodiment of the present invention.

The physical construction of the four-wheel drive of a preferred embodiment of the present invention is illustrated schematically in FIG. 1. The drive power generated in an internal-combustion engine 1 is transmitted through a gearbox 2 and a lockable differential gear (rear axle differential 3) to the rear wheels 4 and 5. The drive power can also be transmitted through a lockable auxiliary gear (central differential 6) to a further lockable differential gear (front axle differential 7) and thereby to the steered front wheels 8 and 9.

Rotary speed sensors 10, 11 and 12 are arranged on the front wheels and on the articulated shaft of the rear axle differential. These sensors 10, 11 and 12 are already present if the vehicle is equipped with an anti-skidding system. A steering angle transducer 13, which senses the rotary angle of the steering wheel, not shown, is also provided.

The signals of the rotary speed sensors 10, 11 and 12, and of the steering angle transducer 13, are inputted into a control unit 14 which also receives the signal of the brake-light switch 15 of the vehicle. The control unit 14 processes these signals into actuation signals for the engagement of the central differential 6, of the central differential lock 6a, of the rear axle differential lock 3a and of the front axle differential lock 7a. The respective switching states are indicated in an indicator unit 16 on the instrument panel of the vehicle. The control unit 14 is a standard microprocessor.

Figure 2:
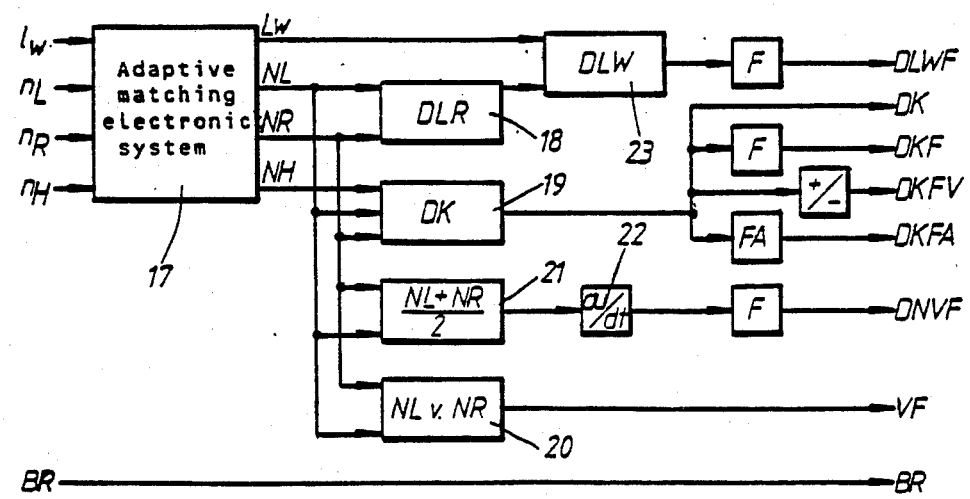
FIG. 2 is a block diagram of the processing of the measured values.

The processing of required measured values from the signals $n_L$; $n_R$; $n_H$, $l_W$ of the three speed sensors and of the steering angle transducer respectively is illustrated in FIG. 2. The four signals first pass through an adaptively operating matching electronic system 17, which effects a balancing between the wheels of the front axle and rear axle and also between the left-hand and right-hand front wheel speed. The system 17 also performs a zero point balancing of the steering angle transducer.

The engagement limits, and more particularly the disengagement limits, of the four-wheel control system should be set as narrowly as possible in order to create an efficacious apparatus. Considering the mechanical imprecision, dictated by the design, of the rotary speed sensor 12 on the articulated shaft of the rear axle differential 3, and adding to that the possible different degree of wear and air pressure of the wheels, and since different tires may also be fitted with snow chains, the sum of these imprecisions is certainly greater than is admitted by the switching limits of a useful four-wheel control system. An adaptation to the actual conditions of direct forward travel is then a great advantage.

The adaptation is always performed when the travelling speed and the vehicle acceleration do not exceed prescribed values; when the steering angle varies only within a determined angular range; and when all the engageable drives and locks are disengaged and the brake is not actuated. Under these preliminary conditions it is assumed that the vehicle is travelling directly forward and the instantaneous travelling slip is zero. The amplification factor of the rear wheel rotary speed $n_H$ found is made to follow a given adjusting speed, so that the calculated slip converges towards zero. By the same method the rotary speed $n_R$ of the right-hand front wheel is balanced against the rotary speed $n_L$ of the left-hand front wheel, until no further rotary speed difference appears and the steering angle zero point is determined. The last valid values are stored when the vehicle is parked.

The adaptively operating matching electronic system adapts the signals received from the sensors to provide for adaptation of the control unit to account for the actual driving conditions and condition of the vehicle.

The corrected values LW, NL, NR and NH appear at the outputs of the matching electronic system 17. The difference DLR of the front wheel rotary speeds NL and NR is calculated in a difference calculator 18.

The slip DK of the rear wheels compared to the front wheels is calculated from the values NL, NR and NH in a slip calculator 19 according to the formula:

$$DK = NH - NL/2 - NR/2 + NH \cdot f(DLR) \quad (1)$$

The correction value f (DLR), the so-called "Ackermann correction", arises from the deviation of the mean front wheel rotary speed from the rear wheel rotary speed as the result of travelling in a curve, when the front wheels travel a longer distance than the rear wheels. It can be represented as a function of DLR clearly independent of vehicle speed. The values f(DLR) as a function of DLR are contained in a memory. The slip value DK is a correct-sign speed difference.

For example, if the drive of the additional axle and central differential lock are engaged, then by formula 1 the slip differs from zero only by the fraction f (DLR). This occurs when, while starting in snow or sand, the wheels spin on one side or crosswise. In this case, the rear axle differential lock is additionally engaged when the limit slip value is exceeded.

The sign DKFV of this quantity is extracted separately, because this shows whether tractive slip or thrust slip is involved. The slip value DK is passed through a first time filter F, which has a determined first time constant. The filtered slip is designated DKF. In parallel with this, the slip value DK is passed through a second time filter FA with a second and larger time constant and thereafter designated DKFA.

The travelling speed is derived from the slower turning front wheel. This is determined by a selection circuit 20. The travelling speed VF is equated with the circumferential speed of this slower turning wheel.

The vehicle acceleration is derived from the mean rotary speed of the front wheels. The term (NL+NR)/2 is formed in a calculating circuit 21. When passed through a differentiator 22 and a filter F, this term gives rise to the filtered vehicle acceleration DNVF.

A further engagement criterion is derived from the correlation between the steering angle LW and the left-right deviation DLR of the front wheels. The correct-sign difference quantity DLW, is calculated from these two quantities by the formula $$DLW = LW \cdot c \cdot k \cdot (v) - DLR \quad (2)$$

in a steering angle calculator 23, and is regarded as a quantity characteristic of the movement condition of the vehicle in a preferred embodiment of the present invention. It may also be replaced by the transverse acceleration or the yawing angle acceleration of the vehicle, for example.

In the above formula, the terms are defined as follows:

LW ... the steering angle which is sensed directly at the steering column, c ... a physical conversion factor of c° steering angle per percent rotary speed difference of the front wheels, as a function of the steering ratio, k (v) ... a "dynamic" correction value which is a function of the vehicle travelling speed.

The values c and k (v) are contained in a memory. This steering angle criterion is independent of the slip criterion, and may be needed in circumstances in which slip appears too late or not at all. In addition to the circumstance already mentioned, when the vehicle enters a continually tightening curve without longitudinal acceleration, this criterion may also be needed, for example, when there are counter-steering movements in curves which are taken fast. The calculated quantity DLW is likewise passed through a time filter and then designated DLWF.

Lastly, a brake signal BR is tapped from the brakelight switch, where BF=1 is valid for a braking operation.

The measured and calculated quantities referred to—vehicle speed and vehicle acceleration, slip and movement condition—are compared in the control unit 14 with determined limit values or limit curves, and when the latter are exceeded or not attained, engagements or disengagements of the four-wheel drive components occur. These engagements occur in a given sequence from switching stage to switching stage. They have the following connotations:

Switching stage 0: normal rear-wheel drive,

Switching stage 1: switching stage 0 with the addition of front-wheel drive (central differential), Switching stage 2: switching stage 1 with the addition of central differential lock, Switching stage 3: switching stage 2 with the addition of rear axle differential lock, Switching stage 4: switching stage 3 with the addition of front axle differential lock.

The limit values or limit curves for the engagement or disengagement of the four-wheel drive components are defined below.

Switching stage 1 is engaged when starting a vehicle from rest until a first limit speed value, $VF=20$ km/h, for example, is exceeded and the vehicle speed has not dropped below a second lower limit speed value, $VF=10$ km/h, for example. Such an engagement is realized by a comparator with switching hysteresis. The digital condition VF=0 means that the travelling speed has not exceeded the first limit value or failed to attain the second limit value and that switching stage 1 is engaged. On the other hand, VF=1 signifies that switching stage 1 is disengaged unless any other condition maintains an engagement.

Acceleration:

As already mentioned, the quantity DNVF that is differentiated from the mean front wheel rotary speed and filtered is used as the vehicle acceleration and compared with Here the digital condition DNVF=0 means that the switching stage 1 is disengaged unless any other engagement condition exists, and DNVF=1 means that the limit value has been exceeded and switching stage 1 has been engaged.

Slip:

It is necessary here to differentiate between tractive slip and thrust slip. The following designations will be made in this preferred embodiment:

A limit value, defined later, is designated DKMAX=f (VF), where (a) a switching stage (not higher than switching stage 2) is engaged when the filtered thrust slip value DKF exceeds this limit value. The digital condition is: (DKF≧DKMAX).

DKF=1 ... Limit value exceeded;

and

DKFV=1 ... Sign negative (thrust slip).

The switching stage is disengaged again when this condition ceases.

(b) the switching stages 1 to 4 are engaged consecutively when the filtered tractive slip value DKF exceeds this lilmit value.

The digital condition is (DKF≧DKMAX)

DKF=1 ... Limit value exceeded;

and

DKFV=0 ... Sign positive (tractive slip).

(c) the switching stages 4 to 1 are disengaged consecutively when the tractive slip value DKFA passed through the second time filter fails to attain the limit value which also is a function of DLR.

The digital condition is:

DKFA=0 (DKFA<DKMAX (DLR)).

(d) for switching, two further switching stages are engaged rapidly, where possible, when the unfiltered slip value DK exceeds twice the limit value 2 DKMAX, and are disengaged again when this condition ceases.

The digital condition:

DK=1 ... twice limit value exceeded;

and

DK=0 ... twice limit value not attained.

Figure 3:
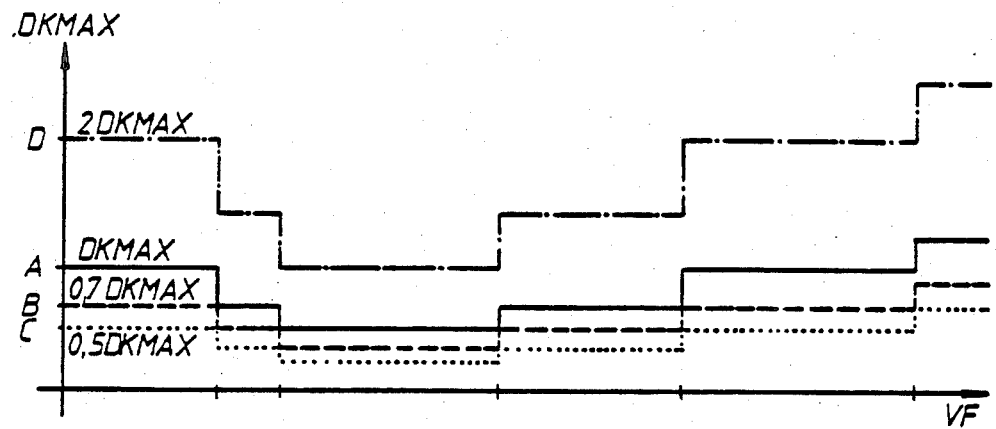
FIG. 3 is a graph of various limit slip values.

The limit slip value DKMAX is a function of the travelling speed, and for medium travelling speeds it has a low value which increases towards both lower and higher travelling speeds. This curve is stepped for digital processing. FIG. 3 shows it as a thick continuous curve A in a graph with the travelling speed VF plotted on the abscissa and the limit value DKMAX on the ordinate. The curve A forms the limit value for the designations (a) and (b) made above. The chain-dotted curve D, which exhibits twice the value of the curve A, is the limit value for the designation (d).

The limit slip value for the disengagement of the individual switching stages in the case of tractive slip according to designation (c) is a function, not only of the travelling speed, but also of the left-right deviation of the front wheels. This is designated as follows in this preferred embodiment:

| Left-right deviation | Limit value for switching back |
| --- | --- |
| DLR ≦ 8% | 0.5 . DKMAX |
| 4% < DLR ≦ 8% | 0.7 . DKMAX |

| Left-right deviation | Limit value for switching back |
| --- | --- |
| 8% < DLR | 1.0 . DKMAX |

It will be seen from this that in the case of a left-right deviation of more than 8%, the limit value for disengagement corresponds to the curve A in FIG. 3, the same limit value for engagement. For a deviation of between 4% and 8%, the values of curve A are reduced by the factor 0.7. This curve is shown as a dashline in FIG. 3 and denoted by B. Lastly, the a deviation of 4% or less, the values of curve A are reduced by one half. This curve is shown dotted and denoted by C.

Figure 4:
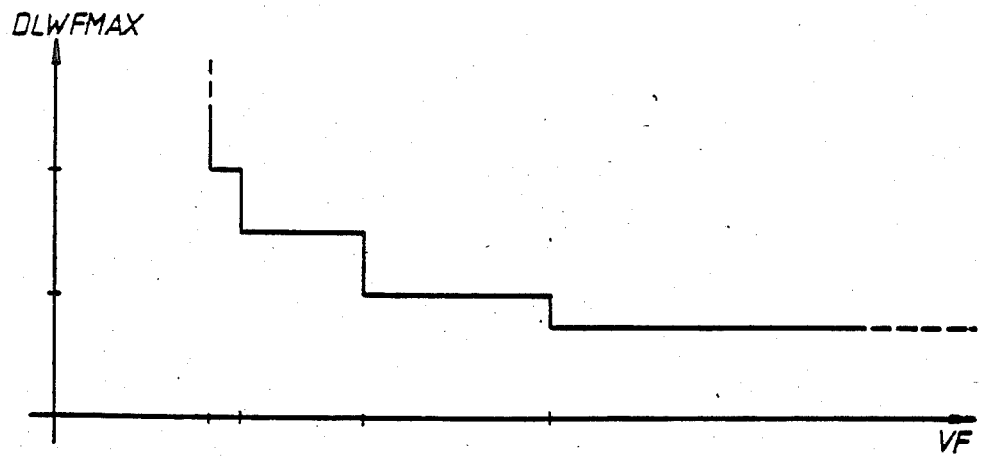
FIG. 4 is a graph of a limit value curve as a function of the steering angle.

Movement condition:

The limit value DLWFMAX with which the quantity DLWF characteristic of the movement condition of the vehicle is compared is a function of the travelling speed VF and illustrated as a curve in FIG. 4. From this graph it can be seen that the "steering angle criterion" does not react below a given travelling speed, 25 km/h for example, because the limit value DLWFMAX is infinitely high. Also, the limit value grows continually smaller with increasing travelling speed.

The digital condition is:

DLWF=1 ... DLWF≧DLWFMAX;

and

DLWF=0 ... DLWF<DLWFMAX

DLWF=1 means that the limit value DLWFMAX has been exceeded. In this case, only switching stage 1 is engaged, unless this has already occurred.

It is further provided by preferred embodiment that after a switching stage has been reached, this stage continues to be maintained for a given stabilization time in order to wait for the reaction. It is accordingly necessary, after the cessation of a condition or after the appearance of a switching back condition, to wait for a given holding time which may be a multiple of the stabilization time, before switching back to a lower switching stage. The stabilization times and holding times may be different from each other.

No holding time is observed after the rapid engagement for the condition DK=1, for which, after the cessation of the condition and after the stabilization time has elapsed, switching back through the engaged stages occurs immediately.

Again, no holding time is observed when a brake signal (BR=1) appears. When BR=1 switching back occurs from all stages to switching stage 0 if the travelling speed is above the second limit speed value of the starting condition (VF=1). If it is below this second limit speed value (VF=0), then switching back to step 1 occurs.

Therefore, in this preferred embodiment, the starting condition (VF=0) ranks above the brake condition (BR=1), while the brake condition ranks above all the other criteria.

Undesirable pendulum switchings may occur due to the engagement of a switching stage, particularly switching stage 1, followed by subsequent cessation of the switching condition and resulting switching back, and so on. This can occur when travelling on passes, for example. In order to avoid such pendulum switchings a memory device is provided which effects a prolongation of the holding time when a new engagement occurs within a determined period after the disengagement of a switching stage. Periodic engagements and disengagements in the range of several seconds are no longer experienced by the driver as cyclic. Particularly, road irregularities and periodic engagement can scarcely be distinguished from one another for such switching times.

Figure 5:
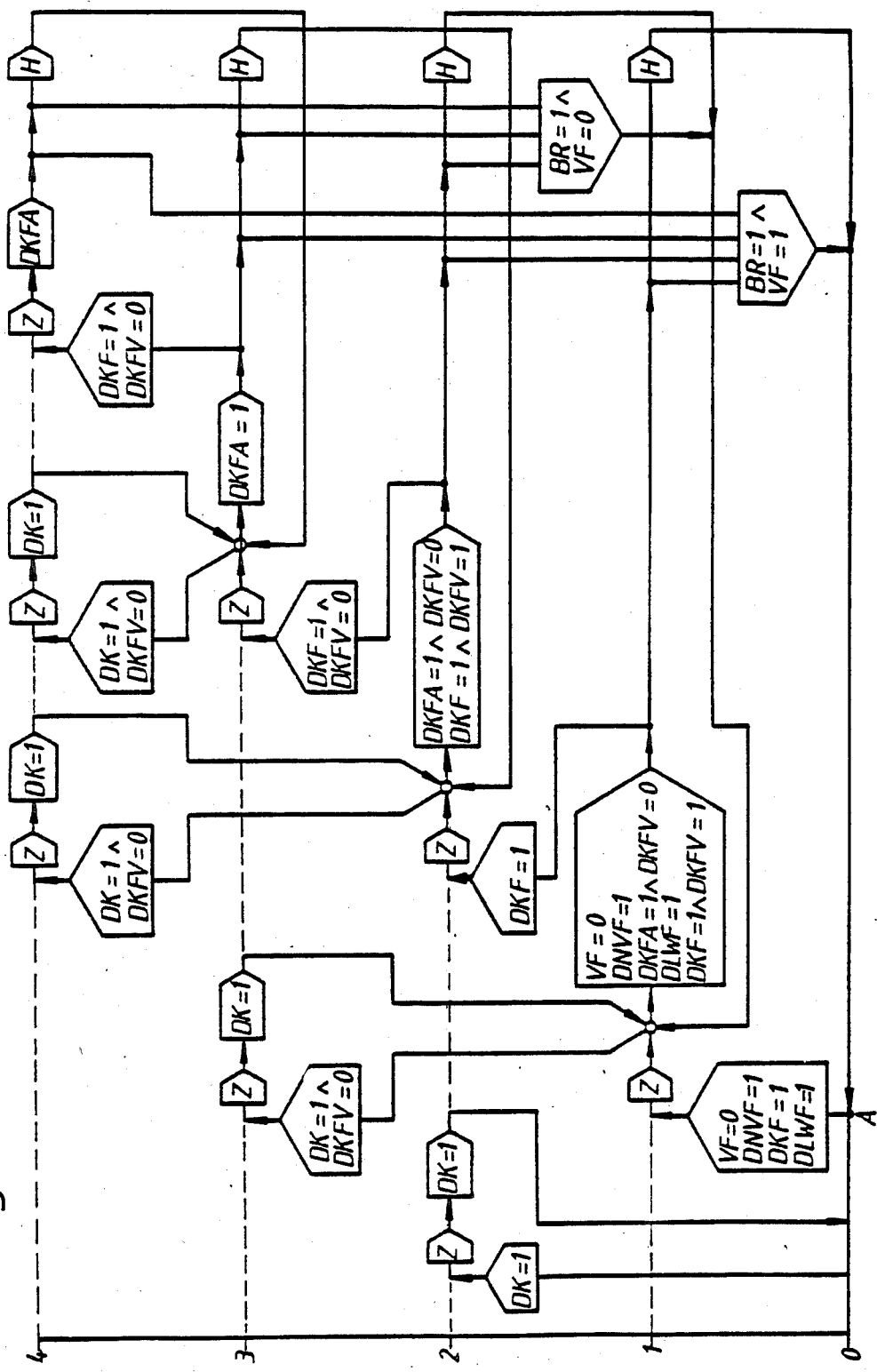
FIG. 5 is a flow chart of a preferred method of operation of the embodiment of FIG. 1.

FIG. 5 shows a combined function and flow chart. The individual switching stages 0 to 4 are marked on the left; these states extend horizontally along the dashlines across the entire width of FIG. 5. The individual vertical arrows directed upwards or downwards symbolize engagements or disengagements from or to the switching stages at which they start or end respectively. Horizontal continuous lines signify a dwell in the corresponding switching stage. The respective conditions for a change of swtiching stage or for a dwell in a given stage are entered in boxes through which the vector arrows or vector lines lead. Depending upon whether these boxes come to a point upwards, to the right or downwards, the conditions entered are engagement conditions, holding conditions or switching-back conditions.

The boxes which contain Z, which recur frequently in FIG. 5, signify stabilization times which are observed independently of conditions. The boxes which contain H signify holding times. No switching back conditions are entered for switchings back which occur after cessation of the holding condition. These result from the inversion of the holding conditions. Switching back occurs when holding conditions no longer exist. If it is necessary for a plurality of conditions to be fulfilled simultaneously, this is represented by the Boolean connector in the box. All other conditions are "OR" connected in each box.

The starting point for the function chart lies on the line of the switching stage 0 and is designated A. Further explanations of this function chart are considered unnecessary, as they would merely contain repetitions of what has already been stated throughout the application. The function cycle and switching cycle of the apparatus is given below in tabular form, which permits quicker reference. Since stabilization times Z are generally observed when switching up, they are not taken into consideration in the table.

| Engagement | | | |
| From | To | Switching Condition | Remarks |
| --- | --- | --- | --- |
| 0 | 1 | VF = 0 | Starting criterion |
|   |   | DNVF = 1 | Acceleration |
|   |   | DKF = 1 | Thrust slip or tractive slip |
|   |   | DLWF = 1 | Steering angle criterion |
| 1 | 2 | DKF = 1 | Thrust slip or tractive slip |
| 2 | 3 | DKF = 1    DKFV = 0 | Tractive slip |

-continued

| | | | | |
|---|---|---|---|---|
| 3 | 4 | DKF = 1 | DKFV = 0 | Tractive slip |
| 0 | 2 | DK = 1 | | Rapid engagement |
| | | | | Thrust slip or tractive slip |
| 1 | 3 | | | |
| 2 | 4 | DK = 1 | DKFV = 0 | Rapid engagement in the |
| 3 | 4 | | | case of tractive slip only |

| Holding of State | Holding Condition | | Remarks |
|---|---|---|---|
| 1 | VF = 0 | | Starting criterion |
| | DNVF = 1 | | Acceleration |
| | DKFA = 1 | DKFV = 0 | Tractive Slip |
| | DLWF = 1 | | Steering angle criterion |
| | DKF = 1 | DKFV = 1 | Thrust slip |
| 2 | DK = 1 | | Rapid engagement |
| | DKFA = 1 | DKFV = 0 | Tractive slip |
| | DKF = 1 | DKFV = 1 | Thrust slip |
| 4 | DK = 1 | | Rapid engagement (Tractive slip) |
| | DKFA = 1 | | Tractive slip |

| Switching Back | | | | | |
|---|---|---|---|---|---|
| From | To | Switching Condition | | Holding Time | Remarks |
| 4 | 3 | DKFA = 0 | | H | Tractive slip |
| 3 | 2 | DKFA = 0 | | H | Tractive slip |
| 2 | 1 | DKFA = 0 | DKFV = 0 | H | Tractive slip |
| | | DKF = 0 | DKFV = 1 | H | Thrust slip |
| 1 | 0 | VF = 1 | | | Starting criterion |
| | | DNVF = 0 | | | Acceleration |
| | | DKFA = 0 | DKFV = 1 | H | Tractive slip |
| | | DKF = 0 | DKFV = 1 | | Thurst slip |
| | | DLWF = 0 | | | Steering angle criterion |
| 2 | 1 | DK = 0 | | — | Rapid engagement (tractive slip or thrust slip) |
| 3 | 1 | DK = 0 | | — | Rapid engagement |
| 4 | 2 | DK = 0, if previously 2 | | 4 | (Tractive slip) |
| 4 | 3 | DK = 0, if previously 3 | | 4 | |
| 4 | 0 | | | | |
| 3 | 0 | BR = 1 | VF = 1 | — | Disengagement |
| 2 | 0 | | | | |
| 1 | 0 | | | | |
| 4 | 1 | | | | During braking |
| 3 | 1 | BR = 1 | VF = 0 | | |
| 2 | 1 | | | | |

The switching sequences with or without stabilization times and/or holding times mentioned are only valid for the preferred embodiment described. It is also within the scope of the present invention to switch the drive components in a different sequence with the individual switching stages.

For the indication of the individual switching states in this example, an indicator lamp is provided for each switching stage, and is activated during the switching stage or for a given time period from the engagement. From the number of lamps activated, which corresponds to the switching stages switched on, it is possible for the driver to draw conclusions as to the constitution of the road in conjunction with his mode of driving.

It is also conceivable to employ only the control unit 14 on vehicles with anti-skidding devices as an indicator for the travelling state of the vehicle and/or of the road due to the wheel sensors already present.

Lastly, it is noted that a preferred embodiment of the apparatus is equipped with a safety monitoring device, such as is known analogously from the anti-skidding system, which tests the functioning of the individual components and the entire circuit in an initial test when the apparatus is switched on. The sensors and other transducers are likewise continuously checked, and faults that occur are signalled by the indicator lamps, with the entire apparatus being switched off if necessary.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. Apparatus for the automatic engagement and disengagement of drive components of a motor vehicle with a drive axle, particularly the drive means of at least one additional axle, and the locks for auxiliary gear and differential gear, comprising:

sensory means for sensing the rotary speeds of the wheels of said motor vehicle and the steering angle of said vehicle;

control means for receiving at least one input from said sensory means, deriving at least one signal from said at least one input, comparing said at least one signal with at least one reference value stored in said control means, and for controlling the selection of a plurality of switching stages during operation of said vehicle in response to said comparison of said signal and said at least one reference value;

said switching stages being various combinations of engagement of said at least one additional axle and said locks for auxiliary gear and differential gear.

2. The apparatus according to claim 1, further comprising an adaptively operating matching electronic system means for adjusting the control means to account for different wheel diameters and the steering angle corresponding to direct forward travel.

3. The apparatus according to claim 2, wherein said adaptively operating matching electronic system means includes means for deriving a slip value and converging it towards zero by balancing the mean rotary speeds between the wheels of the driven axle and the steered axle.

4. The apparatus according to claim 2, said adaptively operating matching electronic system means includes means for converging towards zero the rotary speed difference of the wheels of the steered axle by balancing the rotary speeds of the wheels of the steered axle.

5. The apparatus according to claim 2, wherein the adaptively operating matching electronic system includes means for converging the steering angle towards zero for direct forward travel by balancing the steering angle.

6. The apparatus according to claim 2, further comprising means for permitting the operation of said adaptively operating matching electronic system means only when the traveling speed is within a given value range, the vehicle acceleration is below a given limit value, the steering angle varies only within a determined angular range and all the engageable drives and locks are disengaged and the brake is not actuated.

7. The apparatus according to claim 1, wherein said control means causes said drive means for at least one additional axle to be engaged in said first switching stage.

8. The apparatus according to claim 1, wherein said control means causes said drive means for at least one additional axle and said lock of central auxiliary gear to be engaged in a second said switching stage.

9. The apparatus according to claim 1, wherein said control means causes said drive means for at least one additional axle, said lock of a central auxiliary gear and a lock for said differential gear of an unsteered axle to be engaged in a third said switching stage.

10. The apparatus according to claim 1, wherein said control means causes said drive means for at least additional axle, said lock of a central auxiliary gear, said lock for a differential gear of an unsteered axle and said lock for a differential gear of a steered axle are engaged in a fourth said switching stage.

11. The apparatus according to claim 1, wherein said at least one signal is the vehicle traveling speed and said at least one reference value includes first and second limit speed values.

12. The apparatus according to claim 1, wherein said at least one signal includes at least one of the acceleration of the wheels of a driven axle and the acceleration of said vehicle, and said reference value is a limit acceleration value.

13. The apparatus according to claim 1, wherein said at least one signal includes the instantaneous tractive slip value and the thrust slip value, and said reference value includes the limit slip value associated with the vehicle traveling speed.

14. The apparatus of claim 13, wherein said instantaneous slip value is the sum of the correct-sign difference between the mean rotary speed of said wheels of the driven axle and at least one of the mean rotary speed of the wheels and the slower of the two wheels of an undriven axle and a correction value.

15. The apparatus according to claim 13, wherein at least one switching stage is engaged after a delay.

16. The apparatus according to claim 1, wherein said at least one signal includes a quantity characteristic of the movement condition of said vehicle and wherein said reference value is associated with at least one of the steering angle and the traveling speed.

17. The apparatus according to claim 16, wherein said quantity characteristic is a function of the rotary speeds of the wheels of an axle.

18. The apparatus of claim 16, wherein the reference value associated with the steering angle corresponds to a tolerance range and to the difference of the steering angle modified by a factor which is a function of the steering ratio and of the vehicle traveling speed and of the geometrical difference of the rotary speed of the wheels of the steered axle which is associated with the steering angle.

19. Device according to claim 16, wherein said quantity characteristic is the mean rotary speeds of the wheels of two axles.

20. The apparatus according to claim 16, wherein said quantity characteristic is the curve radius traveled and the road curvature.

21. The apparatus according to claim 16, wherein said quantity characteristic is a function of the yawing angular velocity of said vehicle associated with the traveling speed of said vehicle.

22. The apparatus according to claim 16, wherein said quantity characteristic is a function of the transverse acceleration of said vehicle associated with said vehicle traveling speed.

23. The apparatus according to claim 1, wherein said sensory means further includes means for sensing the actuation of a service brake at a vehicle traveling speed above a limit traveling speed value.

24. The apparatus according to claim 1, further comprising an indicator means for indicating the engaged switching stage.

25. The apparatus of claim 1, further comprising a first time filter means with a given time constant for receiving at least one input and producing a filtered signal to said control means.

26. The apparatus according to claim 25, wherein said switching stages are prioritized and include higher and lower switching stages.

27. The apparatus of claim 25, wherein said control means engages at least one of said switching stages when at least one filtered signal produced by said first time filter exceeds the reference value.

28. The apparatus according to claim 27, wherein a higher switching stage is engaged only after a predetermined stabilization time after the engagement of a lower switching stage.

29. The apparatus according to claim 26, further comprising a second time filter with a given time constant greater than that of said first time filter for receiving said at least one input and producing a filtered signal.

30. The apparatus according to claim 29, wherein said control means disengages an engaged switching stage when said filtered signal from said second time filter is below said reference value.

31. The apparatus according to claim 30, wherein a lower switching stage is engaged only after a determined holding time after the commencement of the disengagement condition.

32. The apparatus according to claim 31, further comprising a memory device means for prolonging said holding time when a first engagement occurs within a determined period after a disengagment of a switching stage.

* * * * *